(12) United States Patent
Flannigan (10) Patent No.: US 8,016,526 B2
(45) Date of Patent: Sep. 13, 2011

(54) TIE DOWN ANCHOR DEVICE

(76) Inventor: Brian Flannigan, Iron, MN (US)

(*) Notice: Subject to any disclaimer, the term of this patent is extended or adjusted under 35 U.S.C. 154(b) by 654 days.

(21) Appl. No.: 11/964,535

(22) Filed: Dec. 26, 2007

(65) Prior Publication Data

US 2009/0169321 A1 Jul. 2, 2009

Related U.S. Application Data (60) Provisional application No. 60/871,631, filed on Dec. 22, 2006.

(51) Int. Cl.
*B60P 7/08* (2006.01)
(52) U.S. Cl. ........................................ 410/106; 410/116
(58) Field of Classification Search .................... 410/97, 410/102, 106, 110, 116, 117; 24/265 CD, 24/115 K; 248/499
See application file for complete search history.

(56) References Cited

U.S. PATENT DOCUMENTS

| | | | |
|---|---|---|---|
| 2,649,054 A * | 8/1953 | Rueckert | |
| 5,180,263 A | 1/1993 | Flowers, Jr. | |
| 5,248,176 A | 9/1993 | Fredriksson | |
| 5,730,346 A * | 3/1998 | Adams et al. | |
| 5,738,471 A | 4/1998 | Zentner et al. | |
| 5,774,948 A | 7/1998 | Petschke et al. | |
| 6,241,440 B1 * | 6/2001 | Orlebeke | 410/106 |
| 6,364,324 B1 | 4/2002 | Buchanan | |
| 6,984,095 B2 | 1/2006 | Johnson | |
| 7,210,883 B2 | 5/2007 | Smith | |

* cited by examiner

*Primary Examiner* — Stephen Gordon
(74) *Attorney, Agent, or Firm* — Dicke, Billig & Czaja, PLLC (57) ABSTRACT

A tie down anchor device useful, for example, in providing a securement surface for holding cargo within a sled or trailer via a strap or other tie down implement. The tie down anchor device includes an extension body, an attachment assembly, and a loop body. The extension body is flexible but substantially inelastic, formed from a fabric material. The attachment assembly is configured for removably mounting the anchor device to a surface, and is connected to a trailing section of the extension body. The loop body is movably maintained by a leading section of the extension body. With this configuration, upon mounting of the anchor device to a surface (e.g., floor of a sled), the loop body is readily available for connection to an end of a tie down implement (e.g., a hook provided with a rubber strap).

15 Claims, 12 Drawing Sheets

TIE DOWN ANCHOR DEVICE

CROSS-REFERENCE TO RELATED APPLICATIONS

This application claims priority under 35 U.S.C. §119(e)(1) to U.S. Provisional Patent Application Ser. No. 60/871,631, filed Dec. 22, 2006, entitled "Tie Down Anchor Device"; and the entire teachings of which are incorporated herein by reference.

BACKGROUND

The present disclosure generally relates to anchor devices that facilitate securement of various items to or within a towable apparatus (e.g., trailer or sled). More particularly, it relates to an accessory for trailers, sleds (such as an ice sled used to transport ice fishing equipment), ice fish houses (e.g., towable ice fish houses), etc., in the form of a tie down anchor device that is easily assembled to a floor of the trailer and that facilitates use of tie down implements (e.g., rubber straps) in securing items to the floor.

Trailers and similar towable apparatuses are commonly used to transport various items from one locale to another. The trailers can take a wide variety of forms, and are often used in connection with recreational activities. For example, many trailers include wheels so as to be towed over a roadway. For other applications, wheels are not necessary. For example, trailers or sleds are commonly used to transport equipment and related items over ice (or snow-covered ice). One specific example of this approach is in the context of ice fishing where a user desires to transport equipment across the ice to a desired fishing location. Under these circumstances, ice sleds are commonly available, and are adapted to be towed behind a motorized vehicle (e.g., all terrain vehicle, snowmobile, etc.), readily sliding across the snow/ice. Similarly, ice fish houses themselves can also be designed for towing across snow/ice (e.g., sliders or runners on the bottom of the ice fish house), such that for purposes of this disclosure, an ice fish house is considered to be a trailer or sled.

Regardless of the particular application, conventional trailers or sleds normally include a base or floor from which various side walls extend to define a containment space in which a number of items/equipment (or other cargo) can be stored and transported. To promote transport of a number of items, the containment space of a conventional trailer or sled is relatively large. While the provision of a relatively large containment space (e.g., larger than any one particular item to be towed) is highly desired by users, potential drawbacks can arise. Mainly, the items are loosely arranged on the floor, and thus will readily move when the trailer or sled is towed over a rough or bumpy surface. When so-displaced, the items can rub or strike against one another, potentially causing damage. Even further, where a significant jostling force is encountered, one or more of the items may be caused to project entirely out of the trailer or sled. This is an all-to-common occurrence when transporting equipment using an ice sled or a towable ice fish house. While strings or other tie down implements could be used to better secure the items within the trailer/sled, conventional trailer and sled designs are entirely devoid of an appropriate surface to anchor or attach the tie down implement. Instead, the user is forced to loosely attach the tie down implement to a random edge or surface of the trailer/sled, or spend significant time attempting to effectuate a more secure arrangement.

In light of the above, a need exists for a tie down anchor device accessory that is readily assembled or retrofitted to an existing trailer or sled (including a towable ice fish house) and that provides an appropriate body or surface for anchoring an end of a strap or similar tie down implement used to secure one or more items to the trailer or sled.

SUMMARY

Aspects of the present disclosure relate to a tie down anchor device useful, for example, in providing a securement surface for holding cargo within a sled or trailer via a strap or other tie down implement. With this in mind, the tie down anchor device includes an extension body, an attachment assembly, and a loop body. The extension body is flexible but substantially inelastic, formed from a fabric material. The extension body defines a leading section and a trailing section. The attachment assembly is configured for removably mounting the anchor device to a surface, and is connected to the trailing section of the extension body. Finally, the loop body is movably maintained by the leading section of the extension body. With this configuration, upon mounting of the anchor device to a surface (e.g., floor of a sled or other trailer), the loop body is readily available for connection to an end of a tie down implement (e.g., a hook provided with a rubber strap). In some embodiments, the extension body is a strip of woven material folded onto itself, with the leading section being deformable so as to gather within the loop body as desired. In other embodiments, the loop body is a continuous, rectangular loop.

Other aspects in accordance with the present disclosure relate to a method to attaching cargo to a sled. The method includes providing a tie down anchor device as described above. The tie down anchor device is assembled to a floor of the sled. A first end of a tie down implement (e.g., strap) is connected to the loop body and the tie down implement extended across cargo otherwise placed within the sled. Finally, an opposite, second end of the tie down implement is connected to the trailer. In some embodiments, the method is performed on an ice sled, and includes drilling a hole through a floor of the sled for mounting of the tie down anchor.

DETAILED DESCRIPTION

Figure 1:
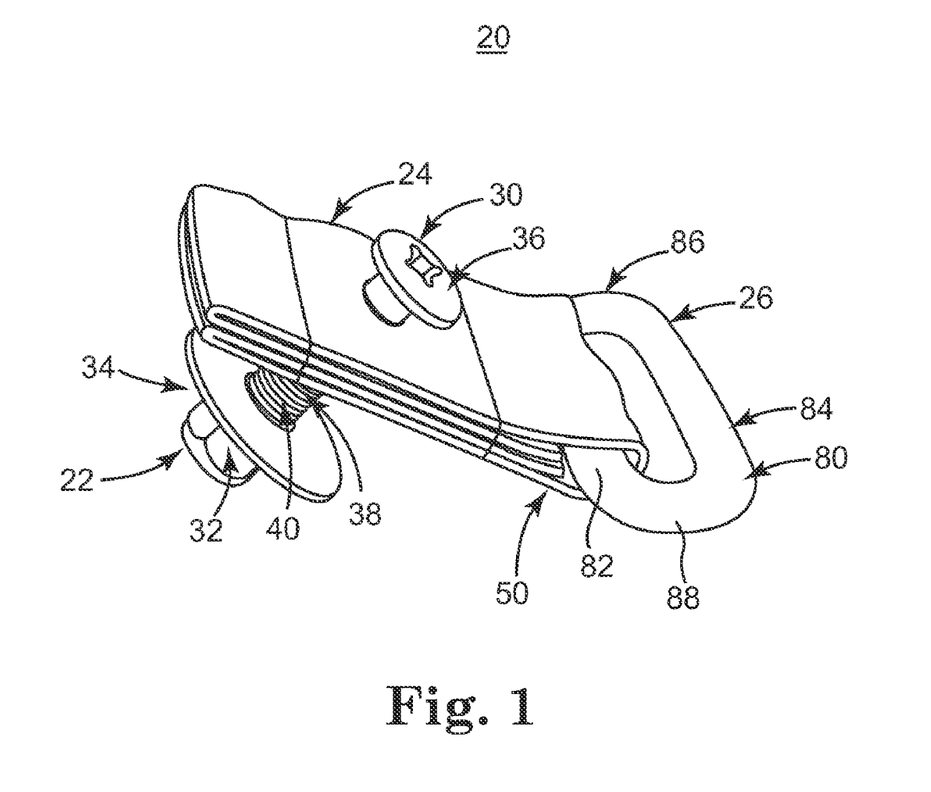
FIG. 1 is a perspective view of a tie down anchor device in accordance with principles of the present disclosure.

One embodiment of a tie down anchor device 20 in accordance with principles of the present disclosure is shown in FIG. 1. In general terms, the anchor device 20 is configured for mounting to a trailer or sled. The terms "trailer" and "sled" are used interchangeably through the specification; thus, unless otherwise indicated, reference to a "sled" includes a trailer, and reference to a "trailer" includes a sled. Further, towable ice fish houses are considered sleds and find use with the tie down anchor device of the present disclosure. The anchor device 20 includes an attachment assembly 22, an extension body 24, and a loop body 26. Details on the various components are provided below. In general terms, however, the attachment assembly 22 facilitates mounting of the anchor device 20 to the trailer or sled. The extension body 24 connects the loop body 26 to the attachment assembly 22. Finally, the loop body 26 provides an appropriate surface for releasable connection with a strap (not shown) or similar tie down implement useful in securing cargo or other item (not shown) to the trailer or sled.

Figure 2:
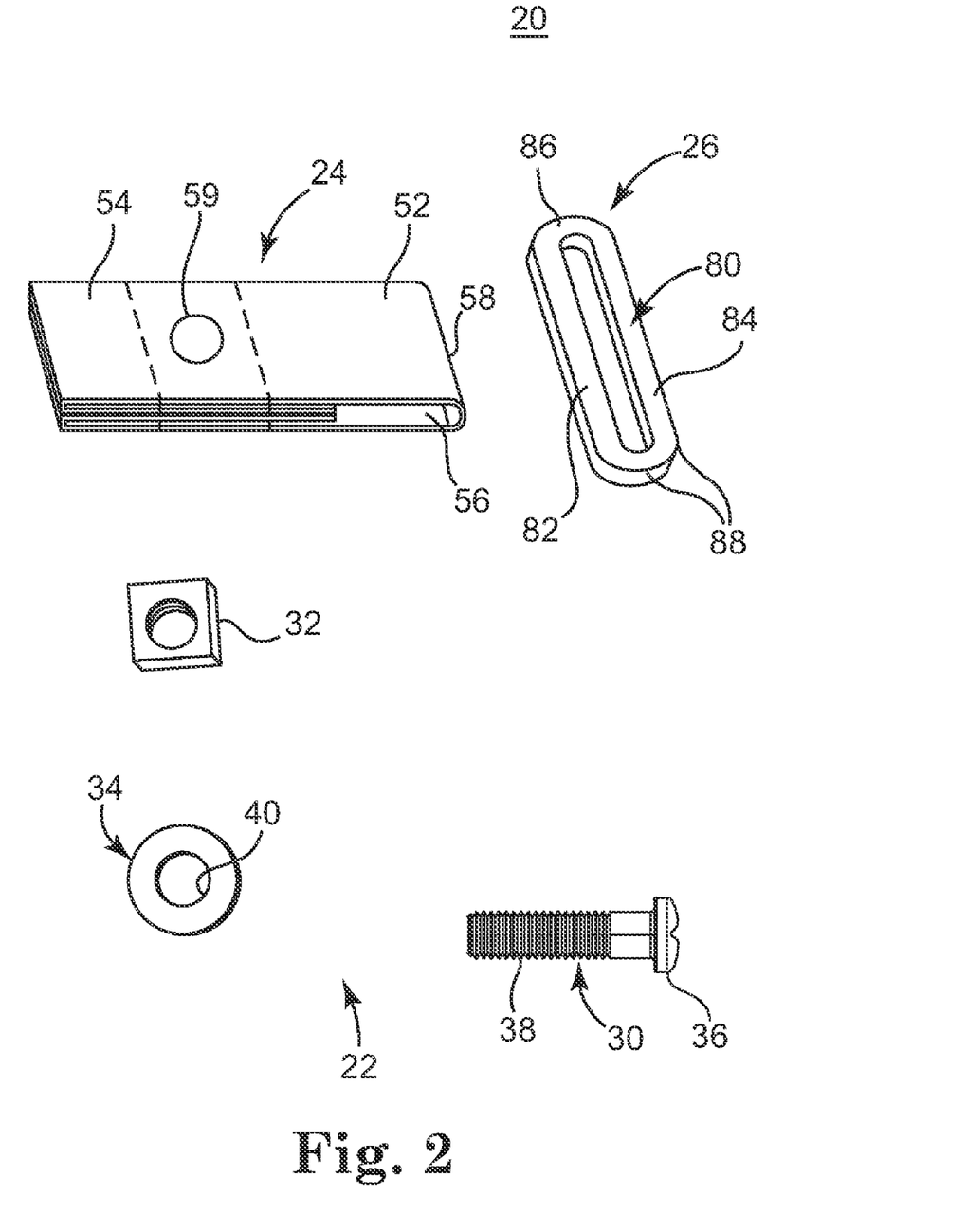
FIG. 2 is an exploded view of the anchor device of FIG. 1.

With additional reference to FIG. 2, the attachment assembly 22 can assume a wide variety of forms, and in some embodiments includes a bolt 30, a nut 32, and a washer 34. The bolt 30 includes a head 36 and a threaded shaft 38. The head 36 can be adapted to provide appropriate surface(s) for interfacing with certain tools (e.g., a screwdriver, wrench, etc.). The nut 32 (e.g., a nylon hex nut), in turn, is sized to be threadably received over the threads of the shaft 38. Finally, the washer 34 includes a central aperture 40 sized to be axially received over the shaft 38. In other embodiments, the washer 34 can be eliminated. Similarly, a wide variety of other known attachment or fastening configurations can also be employed that may or may not entail threadably-coupled components.

With the one embodiment of FIGS. 1 and 2 in which the attachment assembly 22 includes the bolt 30, a length of the shaft 38 is selected to be greater than a thickness of the extension body 24 as well as an expected thickness of the trailer or sled wall to which the attachment assembly 22 is secured. Thus, in some embodiments, the bolt 30 has a length on the order of 0.5 inch, although other dimensions are also acceptable.

The extension body 24 is configured for engagement with the attachment assembly 22 as well as the loop body 26 (e.g., the loop body 26 is captured by or within the extension body 24). In some embodiments, a material of the extension body 24 is selected to exhibit flexibility, yet is substantially inelastic (in terms of longitudinal expansion). For example, in some embodiments, the extension body 24 is a strip 50 of tightly-woven, polymeric fabric. Polyethylene can be used as the weave material for the extension body 24. However, polyester or any other high-tenacity polymeric fabric can be employed, and carbon fiber yarns, ceramic fibers, metallic fibers, etc., are also acceptable. While the extension body 24 is itself flexible, the material comprising the extension body 24 is not. In other words, in some embodiments, the woven material making up the extension body 24 has virtually no stretch. In some embodiments, the substantially inelastic extension body 24 will elastically deform by no more than 5%, in other embodiments by no more than 3%, and in other embodiments by no more than 1% when subjected to a longitudinal pulling force of 20 lbs. Alternatively, the extension body 24 can exhibit other elastic deformation properties.

Figure 3:
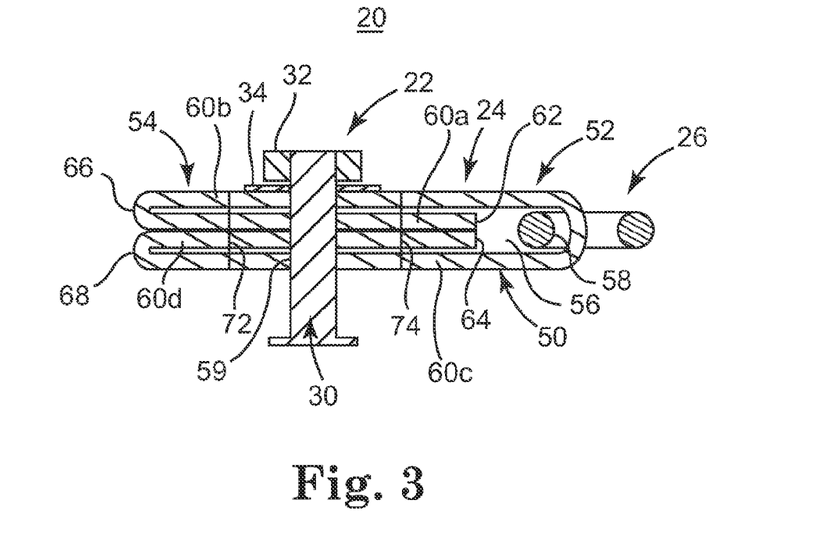
FIG. 3 is a cross-sectional view of the anchor device of FIG. 1.

In some embodiments, and with additional reference to FIG. 3, the extension body 24 is formed by a strip 50 of woven material folded onto itself to define a leading section 52 and a trailing section 54. The leading section 52 forms or includes a passage 56 sized to slidably receive the loop body 26 as described below. In this regard, the leading section 52 can terminate at a closed, wrapped end 58. Conversely, the trailing section 54 is adapted for connection to the attachment assembly 22, for example via a hole 59 extending therethrough.

To better ensure a robust interface between the trailing section 54 and the attachment assembly 22, in some embodiments the extension body 24 is reinforced along the trailing section 54. For example, in some embodiments, the strip 50 is folded onto itself to form a plurality of segments 60 along a trailing section 54. For example, in some embodiments, the strip 50 includes first and second ends 62, 64, and first and second folds 66, 68. As shown in FIG. 3, the strip 50 extends from the first end 62 to the first fold 66 to define a first segment 60a. Extension of the strip 50 from the first fold 66 to the leading section 52, and in particular the closed end 58, defines a second segment 60b. Extension of the strip 50 from the closed end 58 to the second fold 68 defines a third segment 60c, whereas the strip 50 forms a fourth segment 60d between the second fold 68 and the second end 64. By providing a plurality of the segments or layers 60 along the trailing section 54, a reinforced interface with the attachment assembly 22 can be achieved.

To minimize fraying of the extension body 24 material, as well as to ensure a more compact arrangement of the trailing section 54, the segments 60a-60d can be secured to one another via first and second stitch lines 72, 74 formed at opposite sides of the hole 59 (it being understood that with embodiments including a plurality of overlapping segments at the trailing section 54, each of the segments 60a-60d forms a hole, with the holes being aligned to define the continuous hole 59 shown in the figures). In other embodiments, the extension body 24 can assume a wide variety of forms that may or may not include the woven material strip 50. Further, or alternatively, additional components can be included with the extension body 24 that serve to reinforce the strip 50.

The loop body 26 is configured for releasable connection to a corresponding component of a separate tie down strap or cord (e.g., a hook conventionally provided with a rubber strap or bungee cord). Thus, in some embodiments, the loop body 26 is akin to a chain link having a continuous frame 80 (i.e., forms a continuous, uninterrupted loop). The loop body 26 can assume a variety of shapes and sizes, and in the one embodiment of FIGS. 1 and 2 has a rectangular, curvilinear shape (e.g., rounded or curved corners) defined by opposing, first and second legs or sides 82, 84, and opposing, first and second closed ends 86, 88. The legs 82, 84 are parallel to one another, each having a length slightly greater than a width of the extension body 24 (as otherwise defined by the ends 86, 88). The closed ends 86, 88 are, in some embodiments, curved or arcuate so as to not present a sharp edge or corner that might otherwise damage the extension body 24 during use. While the loop body 26 has been described as having a rectangular-like shape, a wide variety of other shapes (e.g., circular, oval, triangular, etc.) are also acceptable. Preferably, however, the loop body 26 includes the continuous or "closed" frame 80 such that upon final assembly, the loop body 26 is permanently mounted to, or captured by, the extension body 24.

The loop body 26 is preferably rigid, able to maintain its structural integrity when subjected to various pulling forces.

In some embodiments, the loop body 26 is a metal-based link that is encased within, or coated with, a protective covering, such as plastic.

Returning to FIG. 3, assembly of the anchor device 20 in accordance with some embodiments includes threading the strip 50 through the loop body 26, and then folding the strip 50 as shown. The stitch lines 70, 72 are then formed, thus permanently capturing the loop body 26 within the passage 56 of the leading section 52. Finally, the hole 59 is formed through the trailing section 54, and is sized to receive the shaft 38 of the attachment assembly 22.

Figure 4:
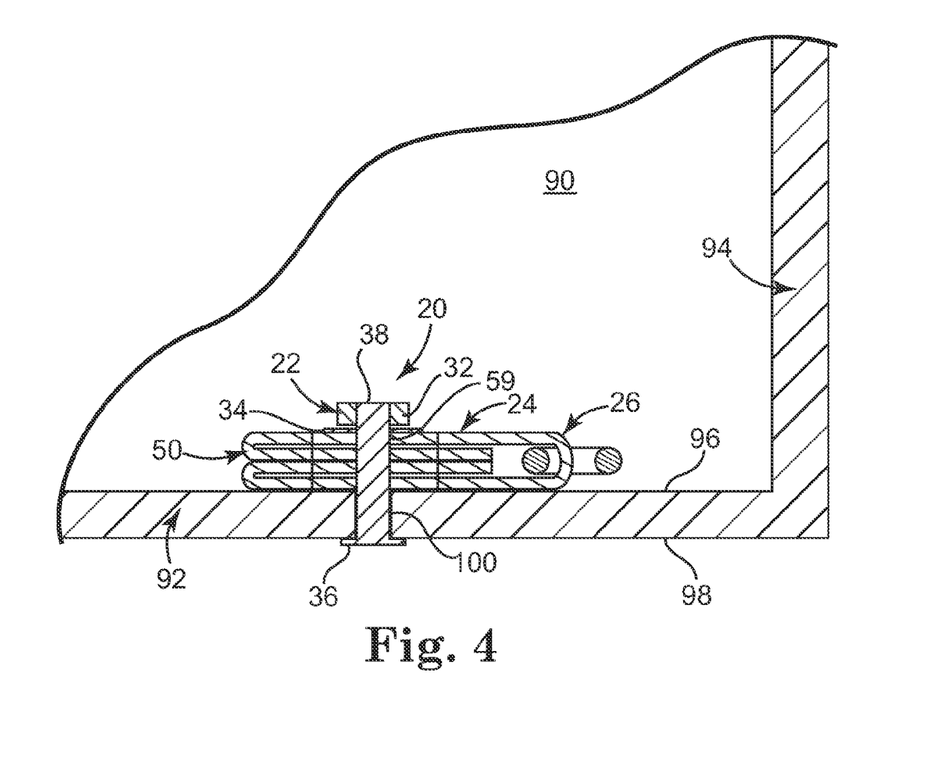
FIG. 4 is a cross-sectional view of the anchor device of FIG. 1 assembled to a trailer.

During use, the anchor device 20 can be assembled to virtually any wall associated with a trailer or sled (not shown). For example, FIG. 4 illustrates the anchor device 20 assembled to a sled 90 (illustrated generally in FIG. 4). The sled (or trailer or towable ice fish house) 90 includes a floor or base wall 92 and one or more side walls 94 (one of which is shown in FIG. 4). The floor 92 defines an upper surface 96 and a lower surface 98, with the side wall(s) 94 extending from or relative to the upper surface 96. With these conventions in mind, the anchor device 20 is assembled to the floor 92 such that the extension body 24 and the loop body 26 are at or along the upper surface 96. More particularly, a bore 100 is formed through the floor 92, sized to receive the shaft 38 of the attachment assembly 22. Upon final assembly, then, the shaft 38 extends through the hole 59 of the extension body 24 as well as the bore 100 of the floor 92. In some configurations, the head 36 abuts the lower surface 98, whereas the nut 32 forces the washer 34 into engagement with the strip 50 that in turn is forced against the upper surface 96 of the floor 92. With this configuration, then, the extension body 24 is tightly secured to the floor 92. The leading section 52 of the extension body 24 extends from the point of attachment with the floor 92, such that the loop body 26 is arranged at, and can be moved relative to, the upper surface 96.

Figure 5:
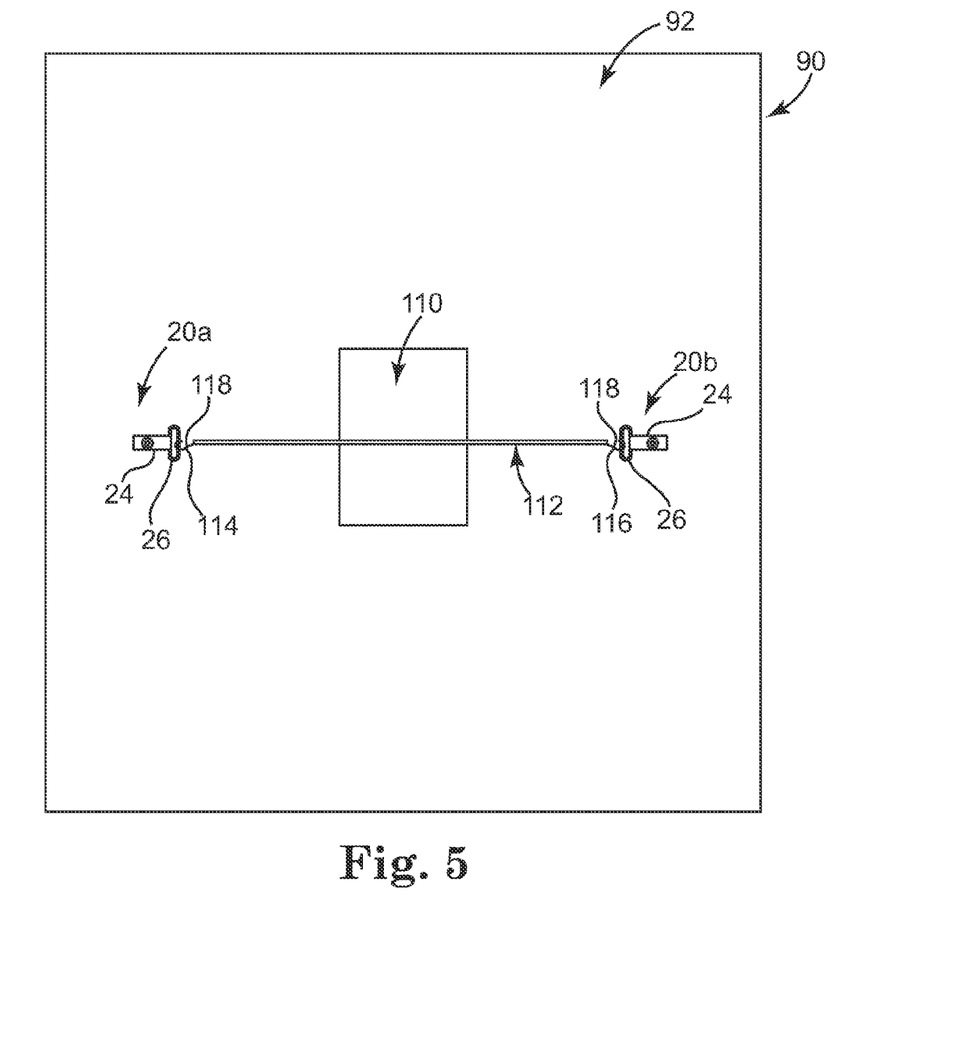
FIG. 5 is a simplified top view of a sled or trailer including two of the anchor devices of FIG. 1 employed to secure an object.

Following assembly to the sled 90, the anchor device 20 is available for interfacing with a separate tie down implement otherwise used to secure an item or items (or cargo) within or to the sled 90. For example, FIG. 5 is a simplified top view of a portion of the sled 90 including two of the anchor devices 20a, 20b assembled to the floor or base wall 92 thereof. In addition, FIG. 5 schematically illustrates an object 110 placed on the floor 92. In this regard, the object 110 is secured to the floor 92 via a tie down implement 112 otherwise extending between the anchor devices 20a, 20b. The tie down implement 112 can assume a variety of forms commonly known, such as a rubber strap, a bungee cord, rope, etc. Regardless, the tie down implement 112 includes a first end 114 and a second end 116. As shown, the first end 114 is secured to the first anchor device 20a, whereas the second end 116 is secured to the second anchor device 20b. Interface between the tie down implement 112 and the anchor devices 20a, 20b can be a function of the tie down implement's 112 construction. For example, with certain configurations, the first and second ends 114, 116 each include a hook 118 that is otherwise mounted to the loop body 26 of the corresponding anchor device 20a, 20b. Alternatively, the ends 114, 116 can be threaded through and tied to the corresponding loop body 26. Regardless, due to the inelastic nature of the extension body 24 associated with each of the anchor devices 20a, 20b, the tie down implement 112 can be tightly tensioned across the object 110 in extending between the anchor devices 20a, 20b. That is to say, although the extension body 24 of each of the anchor devices 20a, 20b is sufficiently flexible to permit movement to a desired spatial orientation/position of the loop body 26 (as described below), the extension body 24 will not experience significant longitudinal extension when subjected to a pulling force, such that the tie down implement 112 can exert a constant holding force onto the object 110. As a result, the tie down implement 112 secures the object 110 to the floor 92.

Figure 6A:
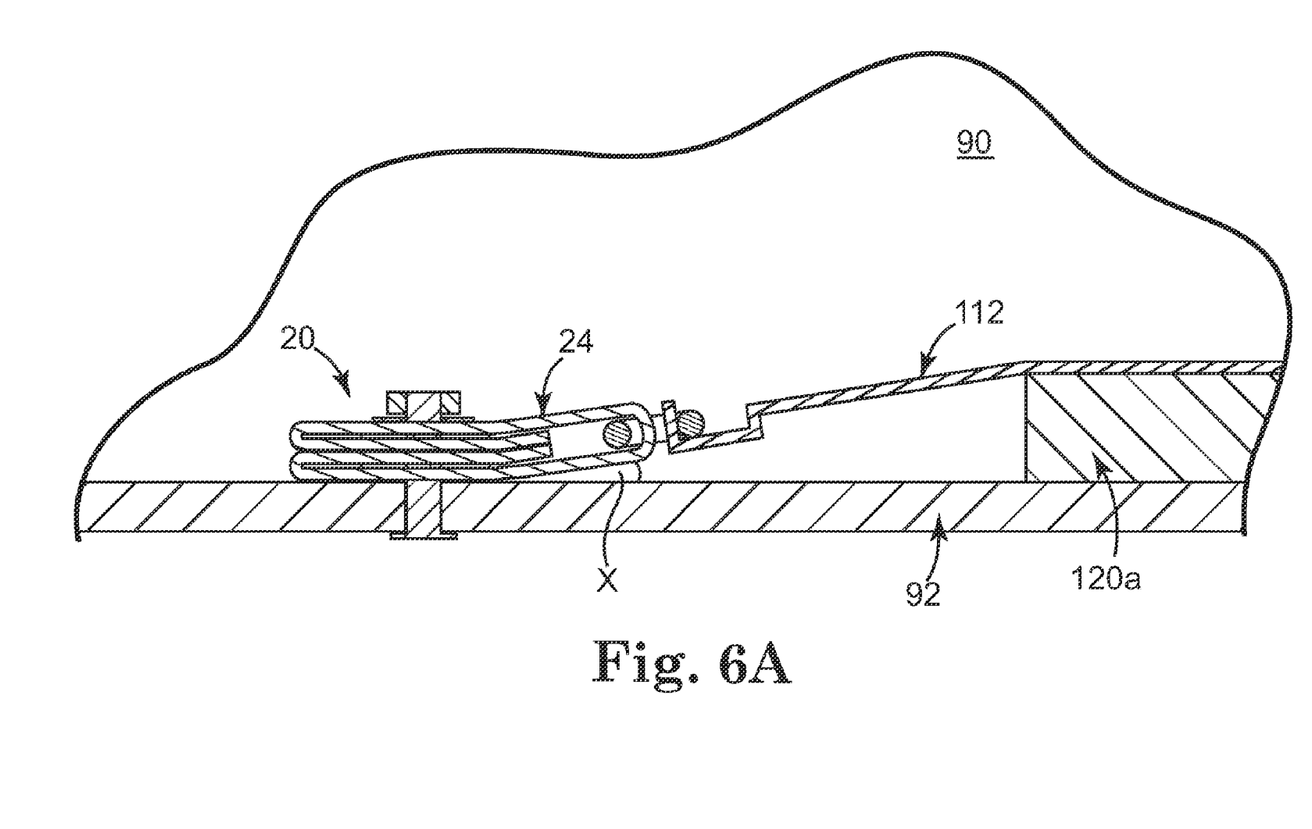
FIGS. 6A and 6B are simplified side views of differently-sized items secured to a trailer floor with the anchor devices of FIG. 1.
Figure 6B:
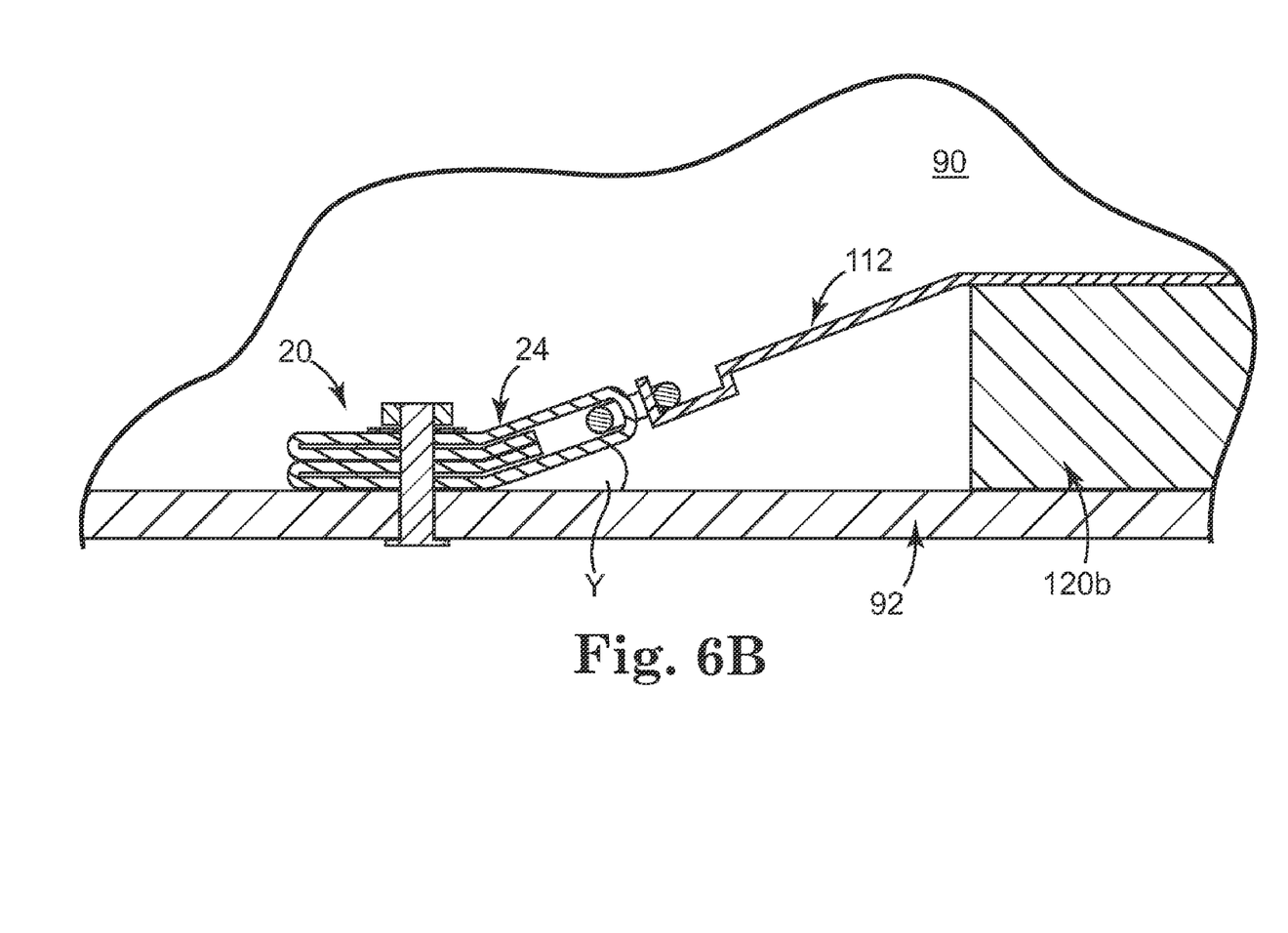

The above-described flexibility of the extension body 24 facilitates use of the anchor device 20 in facilitating securement of a wide variety of differently-sized items or objects to the trailer or sled floor. By way of reference, FIGS. 6A and 6B illustrate use of the anchor device 20 in facilitating securing of differently-sized objects 120a (FIG. 6A) or 120b (FIG. 6B) to the floor 92. More particularly, the second object 120b is larger than the first object 120a. When the tie down implement 112 is tensioned from the anchor device 20, then, the extension body 24 flexibly deflects or "moves" to a different angular orientation relative to the floor 92. In other words, the extension body 24 readily "moves" from the angular orientation X of FIG. 6A to the angular orientation Y of FIG. 6B in accommodating a corresponding size of the object 120a or 120b.

Figure 7A:
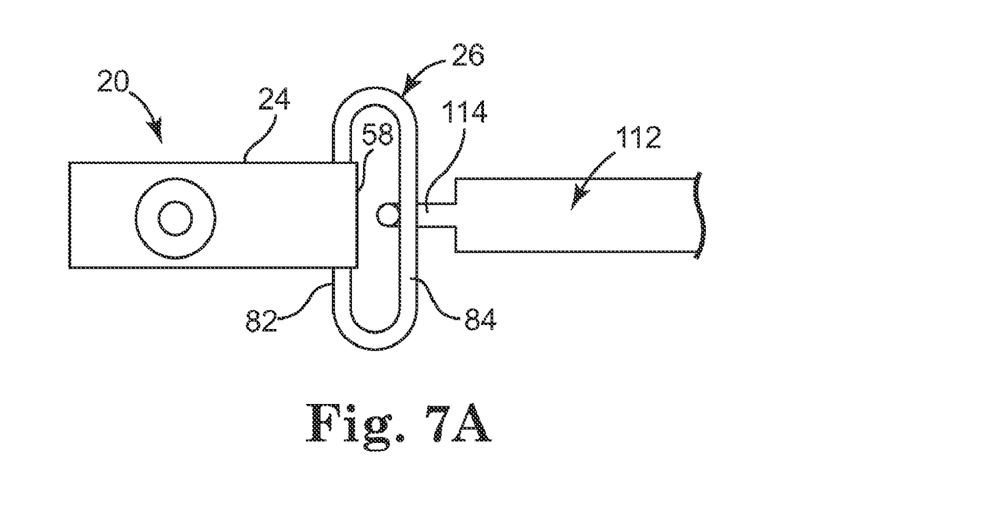
FIGS. 7A and 7B are simplified top views of the anchor device of FIG. 1 along with a portion of a tie down implement, illustrating a variable spatial orientation of a loop body of the tie down anchor device during use.

A further feature provided by the flexible nature of the extension body 24 is in facilitating securement of an item that is otherwise not directly aligned with the anchor device 20. For example, FIG. 7A illustrates a portion of a tie down implement 112 connected to, and extending from the loop body 26. In this regard, the tie down implement 112 is generally aligned with an orientation of the extension body 24, such that the first end 114 of the tie down implement 112 is substantially centered along the second leg 84 of the loop body 26. As shown, the wrapped end 58 of the extension body 24 is substantially uniformly extended across the first leg 82.

Figure 7B:
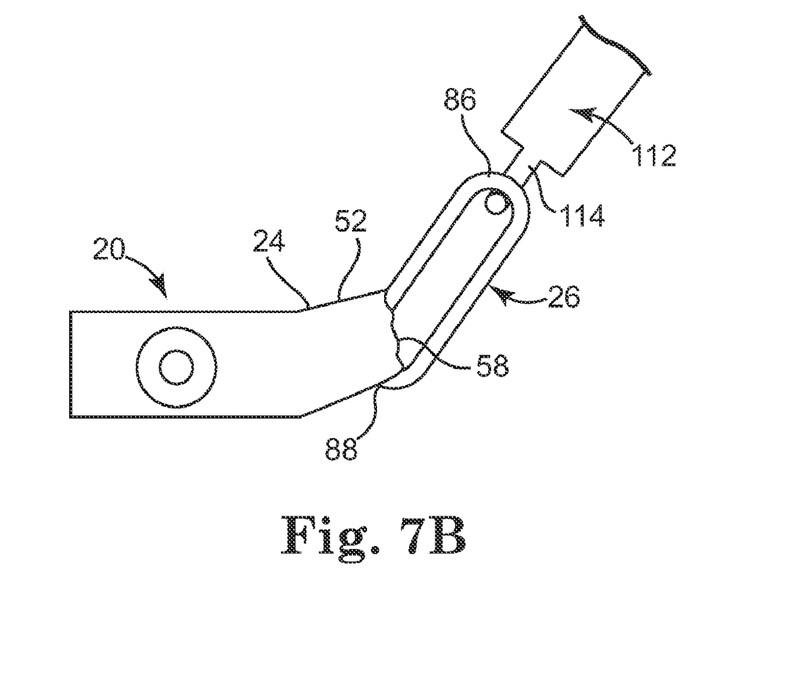

Conversely, with the orientation of FIG. 7B, the tie down implement 112, while again being connected to the loop body 26, extends at an angular orientation relative to the extension body 24. Under these circumstances, the first end 114 of the tie down implement 112 is connected to the closed end 86 of the loop body 26, with the loop body 26 in turn moving or sliding relative to the leading section 52 of the extension body 24 (in response to a pulling force generated by the tie down implement 112). The slidable relationship of the loop body 26 relative to the extension body 24 permits this desired movement. In addition, the extension body 24 does not overtly restrict the desired movement. Instead, the wrapped end 58 of the leading section 52 readily bunches along the second closed end 88 to permit the desired spatial orientation/position of the loop body 26. Notably, however, the inextensible characteristic of the extension body 24 remains even in this "bunched state" such that the extension body 24, and the anchor device 20 as a whole, rigidly resists a pulling force placed thereon by the tie down implement 112. With this construction, then, the anchor device 20 can be placed at virtually any location relative to the floor 92 (FIG. 5) and still assist in retaining an item at any location thereon.

Figure 8A:
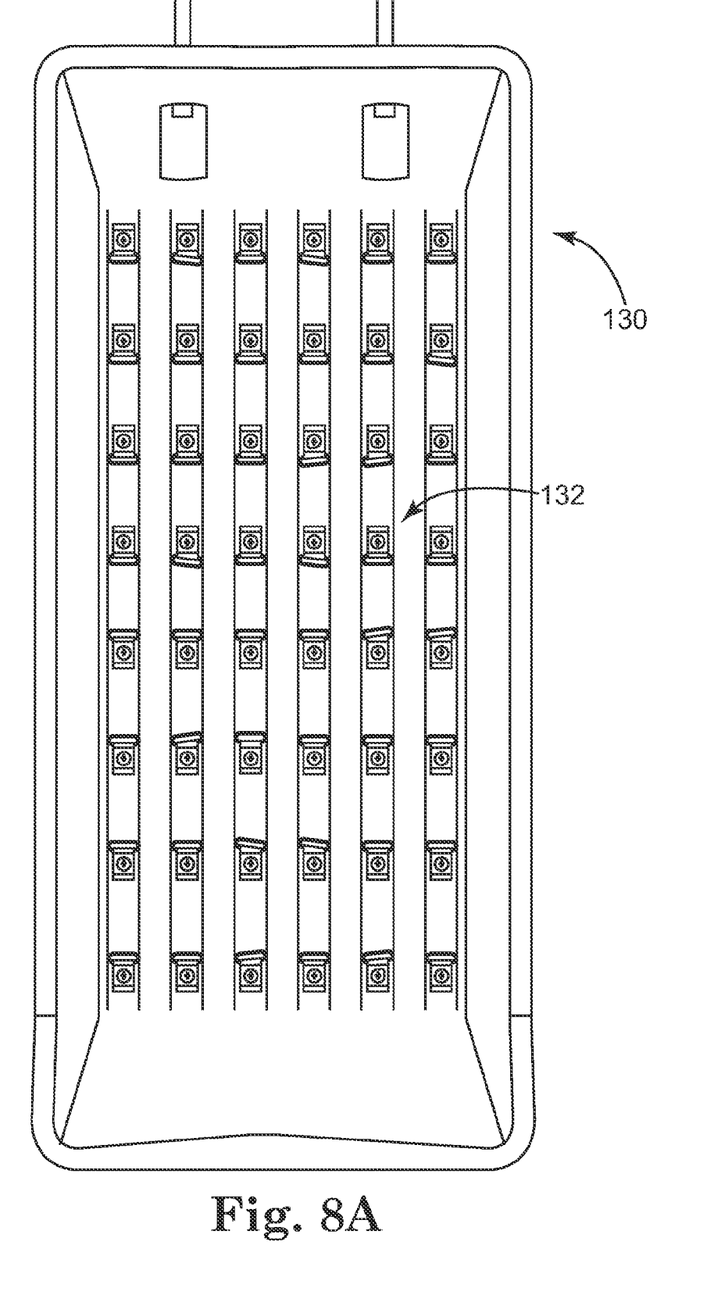
FIGS. 8A and 8B illustrate use of the anchor device of FIG. 1 in securing cargo items to an ice sled.
Figure 8B:
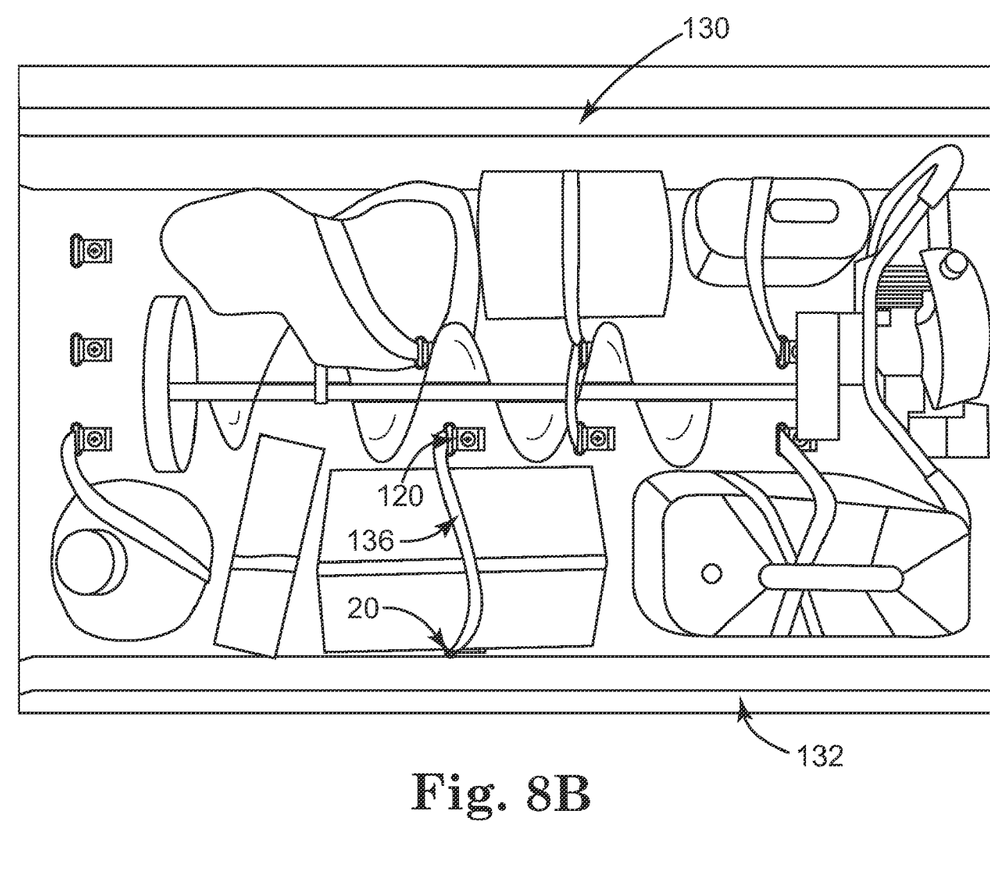

As indicated by the above, the anchor device 20 of the present disclosure can be employed with virtually any type of trailer or sled (including a towable ice fish house). In some embodiments, however, the anchor device of the present disclosure is particularly useful with ice sleds or ice fish houses commonly used to transport ice fishing equipment (e.g., fishing gear, ice auger, gasoline cans, etc.). One such ice sled is available from Shappell Corp., under the tradename JetSled™. In general terms, ice sleds are typically formed of a plastic material (e.g., polyethylene), and include a separate hitch component for connection to a motorized vehicle such as an ATV or snowmobile. While ice sleds of this type (as well as similarly configured towable ice fish houses) are widely used, they are relatively shallow and thus subject to dislodgement of items contained therein while being towed over snow and ice. With this in mind, FIG. 8A illustrates an exemplary ice sled 130 to which a plurality of the anchor devices 20 have been installed. The anchor devices 20 can be randomly or uniformly positioned about a floor 132 of the ice sled 130. With this arrangement, then, multiple ones of the anchor devices 20 can be employed to secure various item(s) 134 to the sled 130 via a tie down implement 136 as shown in FIG. 8B.

Figure 8C:
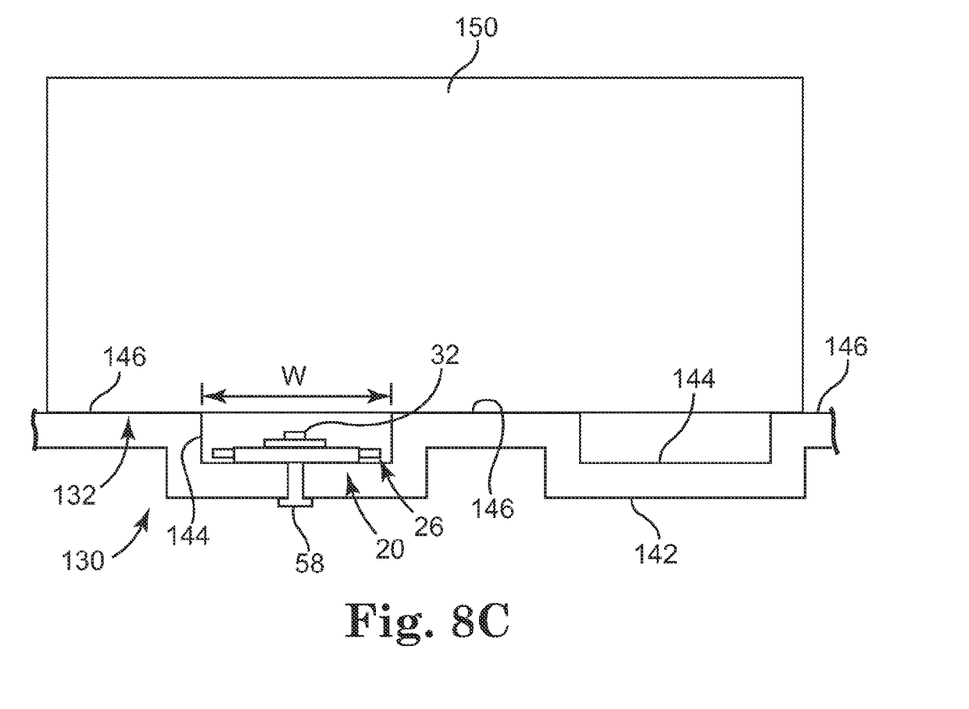
FIG. 8C is a cross-sectional view of the anchor device of FIG. 1 assembled to the ice sled of FIGS. 8A and 8B.

In some embodiments, the ice sled 130 is configured such that the floor 132 has a corrugated-type shape as shown in FIG. 8C. In particular, upper and lower surfaces 140, 142 of the floor 132 form a series of longitudinal slots 144. Further, the upper surface 140 forms a support surface 146 between adjacent ones of the slots 144. With this known construction in mind, in some embodiments the anchor device 20 is configured such that the loop body 26 has a maximum length that is commensurate with (e.g., identical to or slightly smaller than) a width W of the slot 144. Further, the shaft 38 has a length corresponding with a thickness of the floor 132, the extension body 24 along the trailing section 54 thereof, the washer 34, and the nut 32. More particularly, in some embodiments, the shaft 38 is sized such that upon final assembly, the shaft 38 and the nut 32 do not extend beyond the slot 144. As a result, when an item 150 is placed on the floor 132, the item 150 rests on the support surface 146, and is not in contact with (and potentially damaged by) the attachment assembly 22 or the loop body 26.

Figure 9:
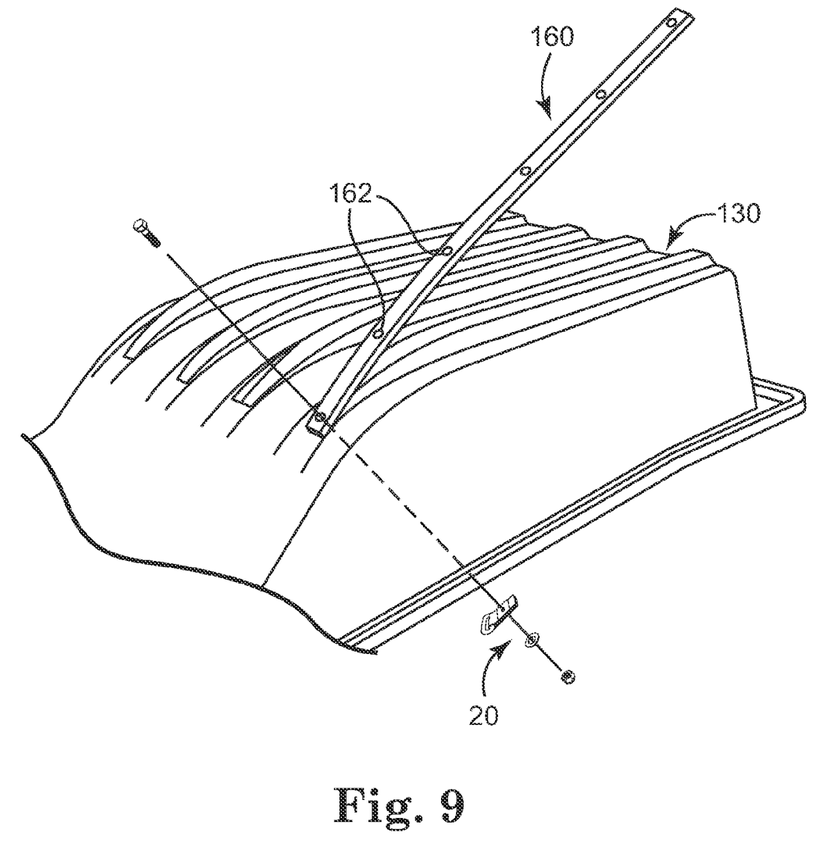
FIG. 9 is a perspective view illustrating mounting of the tie down anchor device of FIG. 1 to an ice sled along with runners.

In related embodiments, it is known to modify the ice sled 130 described above (or a towable ice fish house) to include runners (e.g., Hyfax™ strips or sliders) along the lower surface 142 of the floor 132. Assembly instructions for installing the runners normally include forming holes at specified locations along the floor 132, with fastening devices (e.g., screws) being employed to secure the runner to the floor 132. With this in mind, FIG. 9 illustrates partial assembly of a slider or strip 160 to the lower surface 142 of the ice sled 130 along with one of the anchor devices 20 of the present disclosure. More particularly, the holes 162 otherwise required to be used in assembling the slider 160 to the ice sled 130 are simultaneously used to mount the anchor device 20 as previously described. Thus, for many ice sled and towable ice fish house applications, retrofitting the ice sled 130 to include the anchor devices 20 is highly simplified in that necessary holes through the ice sled's floor 132 already exist due to the presence of the separately-assembled runners 160.

Figure 10:
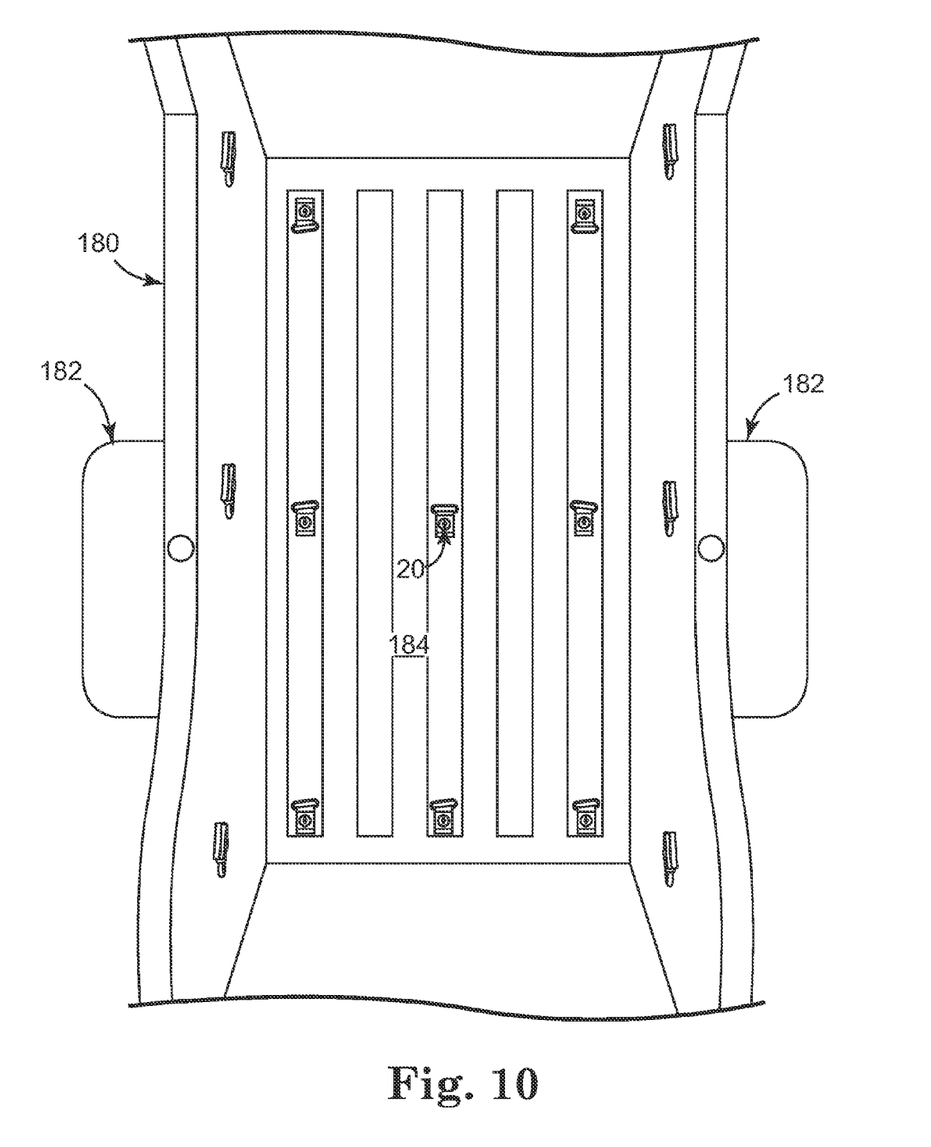
FIG. 10 is a top perspective view of a wheeled trailer to which several of the tie down anchor devices of FIG. 1 have been mounted.

While the anchor device 20 has been described in detail relative to the ice sled 130, a wide variety of other trailer or sled configurations are equally acceptable. For example, FIG. 10 illustrates a trailer 180 including wheels 182, along with a plurality of the anchor devices 20 assembled to a floor 184 thereof.

Although the present disclosure has been described with reference to preferred embodiments, workers skilled in the art will recognize that changes can be made in form and detail without departing from the spirit and scope of the present disclosure.

What is claimed is:

1. A tie down anchor device for use in retaining cargo within a sled, the anchor device comprising:
 a flexible, substantially inelastic extension body formed of a fabric material, the extension body defining a leading section and a trailing section, wherein the extension body includes a strip of woven material folded onto itself to define the trailing section as including a plurality of overlapping strip segments, each of the overlapping strip segments forming a hole, and further wherein the holes are aligned and the extension body includes stitch lines interconnecting the plurality of overlapping segments at opposite sides of the aligned holes;
 an attachment assembly configured for removably mounting the anchor device to a surface, the attachment assembly being connected to the trailing section and including a component slidably received within the holes; and
 a loop body movably maintained by the leading section of the extension body.

2. The anchor device of claim 1, wherein the fabric material is a tightly-woven, polymeric fabric.

3. The anchor device of claim 1, wherein the strip is folded to define the leading section as terminating in a wrapped end and forming a passage within which the loop body is slidably received.

4. The anchor device of claim 1, wherein the attachment assembly includes a bolt having a shaft with a length that is greater than a thickness of the trailing section.

5. The anchor device of claim 1, wherein the loop body defines a continuous, circumferentially closed loop.

6. The anchor device of claim 5, wherein the loop body is rectangular.

7. The anchor device of claim 1, wherein the loop body is permanently captured by the leading section.

8. The anchor device of claim 1, wherein a width of the leading section is greater than a width of an interior of the loop body, and further wherein the extension body is configured to deformably gather within the loop body when the leading section is arranged against a component defining the width of the interior of the loop body.

9. The anchor device of claim 1, wherein the trailing section defines a pivot point at a location of the attachment assembly relative to the extension body, and further wherein the leading section is freely articulatable relative to the attachment assembly via the pivot point.

10. The anchor device of claim 1, wherein the tie down anchor device is configured for assembly to an ice sled.

11. A method of attaching cargo to a sled, the method comprising:
 providing a first tie down anchor device including:
  a flexible, substantially inelastic extension body formed of a fabric material, the extension body defining a leading section and a trailing section,
  an attachment assembly configured for removably mounting the anchor device to a surface, the attachment assembly being connected to the trailing section, and
  a loop body movably maintained by the leading section of the extension body;
 assembling the tie down anchor device to a wall of the sled via the attachment assembly;
 connecting a first end of a tie down implement to the loop body;
 extending the tie down implement across cargo placed within the sled; and
 connecting an opposite, second end of the tie down implement to the sled.

12. The method of claim 11, wherein the loop body is rectangular including opposing sides defining a length and opposing ends defining a width, the width being less than the length and less than a width of the leading section of the extension body, and further wherein the step of extending the tie down implement includes:
 applying a pulling force onto the loop body via the tie down implement; and
 causing the loop body to slide within the leading section of the extension body such that at least a portion of the leading section is in abutment with one of the ends;

wherein the leading section deformably gathers along the abutted end of the loop body.

13. The method of claim 11, wherein the step of extending the tie down implement includes:

causing the leading section to move relative to the attachment assembly from a first position in which the leading section is parallel with the wall, to a second position in which the leading section extends at an angle that is non-parallel with the wall in response to a pulling force applied by the tie down implement to the loop body.

14. The method of claim 11, further comprising:

assembling a second tie down anchor device to the wall at a location spaced from the first tie down anchor device, the second tie down anchor device including a loop body; and connecting the second end of the tie down implement to the loop body of the second tie down anchor device.

15. The method of claim 11, wherein the sled is an ice sled.

* * * * *